(12) United States Patent
Wang

(10) Patent No.: US 11,275,173 B2
(45) Date of Patent: Mar. 15, 2022

(54) YAW RATE FROM RADAR DATA

(71) Applicant: Zoox, Inc., Foster City, CA (US)

(72) Inventor: Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 279 days.

(21) Appl. No.: 16/416,686

(22) Filed: May 20, 2019

(65) Prior Publication Data

US 2020/0371228 A1  Nov. 26, 2020

(51) Int. Cl.
 *G01S 13/58* (2006.01)
 *G01S 13/931* (2020.01)
 *G06K 9/00* (2022.01)

(52) U.S. Cl.
 CPC .......... *G01S 13/931* (2013.01); *G01S 13/58* (2013.01); *G06K 9/00791* (2013.01)

(58) Field of Classification Search
 CPC ...... G01S 13/58; G01S 13/874; G01S 13/931; G06K 9/00791; G06K 9/00805
 See application file for complete search history.

(56) References Cited

U.S. PATENT DOCUMENTS

| 10,088,553 B2 | 10/2018 | Zeng et al. |
| 10,386,476 B2 | 8/2019 | Li et al. |

| 2017/0097410 A1* | 4/2017 | Liu | G01S 13/726 |
| 2018/0356517 A1* | 12/2018 | Cieslar | G01S 13/42 |
| 2019/0265350 A1* | 8/2019 | Hawker | G01S 15/8979 |

FOREIGN PATENT DOCUMENTS

| EP | 3151034 | 4/2017 |

OTHER PUBLICATIONS

The PCT Search Report and Written Opinion dated Aug. 20, 2020 for PCT Application No. PCT/US2020/033608, 9 pages.

\* cited by examiner

*Primary Examiner* — Timothy A Brainard
(74) *Attorney, Agent, or Firm* — Lee & Hayes, P.C.

(57) ABSTRACT

Sensors, including radar sensors, may be used to detect objects in an environment. In an example, a vehicle may include multiple radar sensors that sense objects around the vehicle, e.g., so the vehicle can navigate relative to the objects. First radar data, e.g., from a first radar sensor, and second radar data, e.g., from a second radar sensor, can be analyzed to determine returns representing an object. The returns can then be used to determine a yaw rate and/or a two-dimensional velocity of the object. In some examples, differences in time between sensor data collection can be corrected/compensated based on previous (historical) tracked object information to provide better estimates.

20 Claims, 6 Drawing Sheets

YAW RATE FROM RADAR DATA

BACKGROUND

Planning systems utilize information associated with objects in an environment to determine actions relative to those objects. For example, some existing planning systems for autonomous vehicles consider velocities and/or yaw rates of objects, such as other vehicles on the road, when determining maneuvers for the autonomous vehicle to traverse through the environment. Conventional systems may rely on different types of data, including but not limited to radar, LiDAR, vision, and/or the like to determine information about the object(s). However, conventional systems have required receiving the sensor data over multiple iterations to confidently characterize object movement. For example, determining a yaw rate of a vehicle may require multiple, successive scans of one or more sensors and/or processing of data from a number of different sensor types to determine the correct speed and/or heading of an object. Such processes may result in increased processing time and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
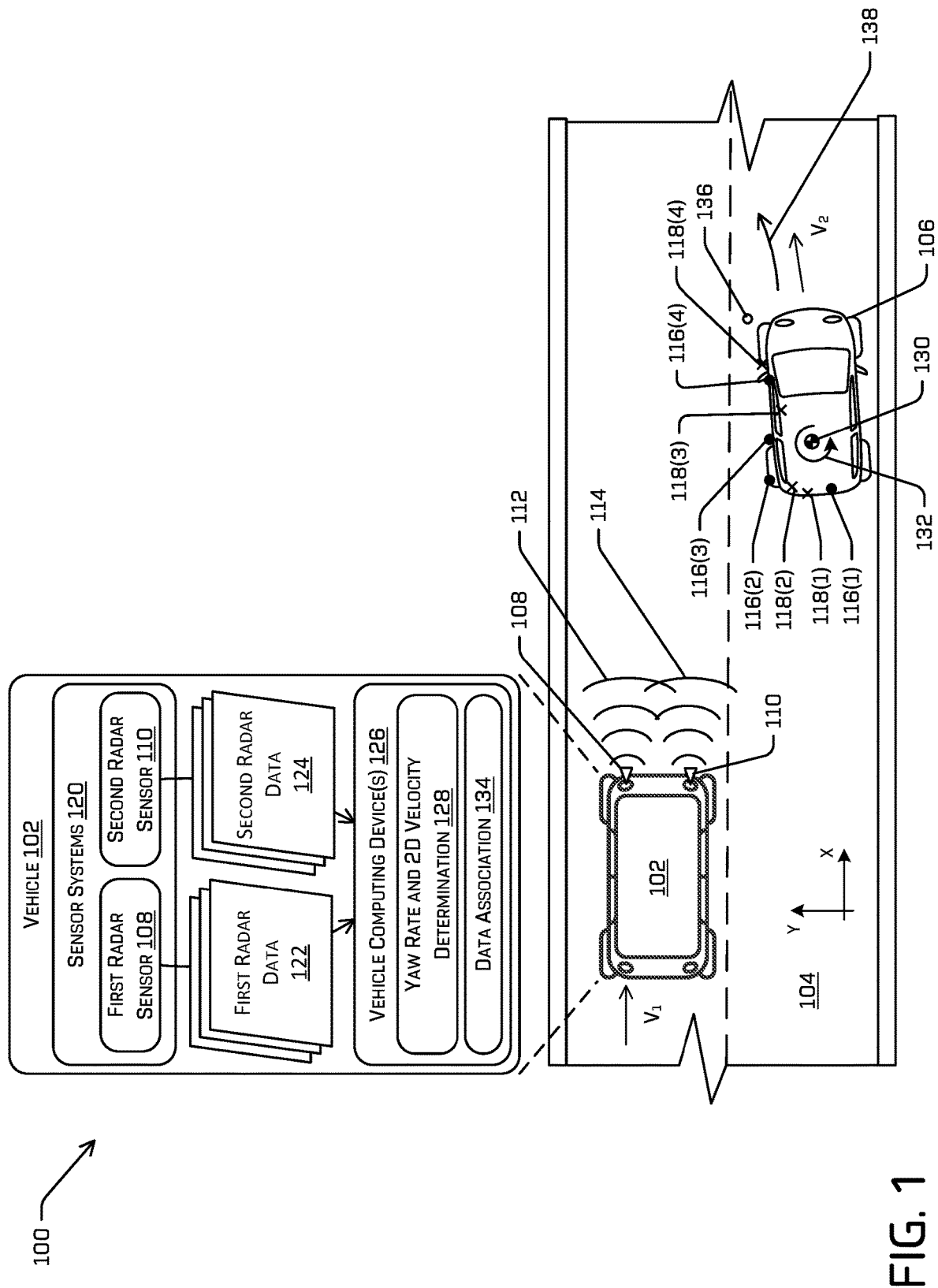
FIG. 1 is a schematic representation illustrating an example method for determining a yaw rate of an object using radar data, as described herein.

Techniques described herein are directed to characterizing movement of objects in in an environment based on radar data. For example, in implementations described herein, techniques may be used to determine radar returns that are associated with an object in an environment of the sensor, and a yaw rate and/or two-dimensional velocity for the object can be determined from the returns. Although many systems may benefit from the techniques described herein, an example system that implements the techniques of this disclosure may include an autonomous vehicle having multiple radar sensors (and/or sensors of other or different modalities). In one such example the autonomous vehicle can include multiple radar sensors having overlapping fields of view. A first sensor, e.g., a first Doppler radar sensor, can capture first sensor data, e.g. a radar scan (which may include a collection of a number of measurements of radar returns as data points), of an environment and a second sensor, e.g., a second Doppler radar sensor, can capture second sensor data, e.g., a second radar scan (which may include a second collection of measurements of radar returns as data points) of the environment. Each of the first scan and the second scan may return a number of points, each having associated information. Such information may include position information, e.g., a location of the point relative to the sensor, the vehicle, and/or in a coordinate system (any or all of which may be determined based on a range and/or azimuth angle of the signal), signal strength information, e.g., a radar cross-section (RCS) value, or velocity information, e.g., a velocity of the point relative to the sensor.

In examples described herein, data association techniques can be used to associate returns in the radar scans to objects in the environment. For example, clustering techniques can be used to group points in the first scan with point in the second scan according to any of the information received with the returns. By way of non-limiting example, points in a similar area, e.g., having close locational proximity, may be candidates for clustering as all being related to a single object. However, in other implementations, the signal strength information, RCS, the velocity information, and/or other information determined by the one or more sensors may also or alternatively be used to cluster points according to implementations of this disclosure. For example, the signal strength may be useful to differentiate between a person standing at a street corner and a light post upon which the person is leaning. For instance, points in the first scan and in the second scan having similar characteristics, e.g., location, signal strength, velocity, may be aggregated as a point cluster, to yield a robust representation of the sensed object. In at least some instances, the multiple scans, e.g., sequential scans of the first sensor and/or the second sensor may be aggregated in a cluster associated with an object. Also in examples, the data association techniques can include historical information about a sensed object. For instance, tracking information associated with an object can be used to determine whether radar returns are expected to be associated with particular objects. In any one or more examples, radar data may be combined and/or compared against data from other sensor modalities (e.g., lidar, vision (images), etc.) to associate the radar data with an object (such as may be detected in another modality and/or detected based on a combination of the modalities).

In example implementations, the aggregated radar returns (e.g., associated with the object) may be used to determine an instantaneous yaw rate and/or two-dimensional velocity (e.g., in an x-direction and a y-direction) of the object with which the returns are associated. For instance, techniques described herein can project individual of the returns onto a rotational center (or an estimated rotational center), e.g., to determine a yaw rate about the rotational center. In this manner, the yaw rate can be determined from a number of returns, and substantially instantaneously. Moreover, the two-dimensional velocity can be determined using geometry associated with positions of points associated with the returns, a position of the radar sensor(s), and a position of the rotational center. Some examples may use an iterative estimation process, e.g., an iterative least square or random sample consensus (RANSAC) methods, though any other statistical methods that are robust to outliers are contemplated. In some examples, RANSAC techniques can provide a robust estimation of yaw and/or two-dimensional velocity based on the returns, while rejecting outliers.

According to implementations described herein, the scans may be nearly identical in time, e.g., within about 100 milliseconds, because the scans are coming from different sensors, but with overlapping fields of view. Moreover, although only two sensors are described in some examples, in other examples, more sensors with overlapping fields of view may be used to further increase the number of points associated with an object, thereby strengthening the returns of the yaw rate estimation techniques described herein. In at least some examples, a single scan from a single radar device may comprise multiple subscans comprising scans at different frequencies, phase shifts, and the like. In such examples, each of the subscans may be treated equally, as overlapping scans from multiple radar. As such, techniques presented herein may be used with one or more sensors.

Techniques described herein can also determine instantaneous yaw rate and/or two-dimensional velocity when the scans to be considered are not captured at the same instance (or within some minimal threshold time range) In some examples, historical data of the sensor(s) (or of an object, e.g., a vehicle, on which the sensor(s) is/are mounted) and/or historical data of the sensed object may also be obtained, e.g., from sensors other than, or in addition to, the radar sensors. In such examples, the historical data may include one or more of historical position data, historical velocity data, historical yaw rate information, historical acceleration data, or other information. The historical information may be used to extrapolate or estimate radar data captured at different times to a common time. For instance, position and/or velocity associated with a return generated at a first time can be used to determine updated position and/or velocity data at a second time based on a state of the vehicle (e.g., position, velocity, yaw rate, acceleration) and/or a state of the object (e.g., position, velocity, rotational center, yaw rate, acceleration) between the first time and the second time. In a simple example, a radar return can be projected to a new position and/or as having a new velocity based on a state velocity and/or state yaw rate of the vehicle and/or the object between the first time and the second time. Then, an instantaneous yaw rate and/or two-dimensional velocity can be determined at the second time based on returns generated proximate the second time, as well as based on returns generated at an earlier time, e.g., the first time.

Conventionally, yaw rate and/or two-dimensional velocities may have been determined using data from multiple sensor modalities and/or using multiple observations, e.g., by determining changes between vehicle poses over relatively long periods of time. However, techniques described herein may result in a yaw rate determination nearly instantaneously. For example, radar returns within tens of milliseconds can be used to accurately determine a yaw rate of objects detected by the sensors.

In some examples, once the yaw rate and/or two-dimensional velocity of the object are determined, the computing device of the autonomous vehicle may determine one or more trajectories for proceeding relative to the object. In some instances, yaw data and/or velocity data generated according to techniques described herein may be combined, or fused, with data from other sensor modalities to predict a movement of the object and/or to plan a path relative to the object.

Techniques described herein are directed to leveraging sensor and perception data to enable a vehicle, such as an autonomous vehicle, to navigate through an environment while circumventing objects in the environment. Techniques described herein can utilize information sensed about the objects in the environment, e.g., by radar sensors, to more accurately determine movement associated with the object. For example, techniques described herein may be faster than conventional techniques, as they may alleviate the need for information from a plurality of different sensors. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system that uses radar data to navigate an environment may benefit from the yaw determination techniques described. By way of non-limiting example, techniques described herein may be used on aircrafts, e.g., to identify other aircraft and/or moving objects, and determine yaw rates associated with objects in an airspace or on the ground. Moreover, non-autonomous vehicles could also benefit from techniques described herein, e.g., for collision detection and/or avoidance systems.

FIG. 1 provides additional details associated with techniques described herein.

FIG. 1 is a schematic illustration showing an example scenario 100 in which a vehicle 102 is driving on a road surface 104 at a first velocity, $V_1$. As also illustrated, a second vehicle 106 is also travelling on the road surface 104. The second vehicle 106 is travelling at a second velocity, $V_2$, in a direction along arrow 138 that is not parallel to the direction of travel of the vehicle 102. For instance, the second vehicle 106 may be changing lanes, e.g., to a position in front of the vehicle 102.

For illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. Additional details associated with the vehicle 102 are described below. However, the vehicle 102 is merely an example, and the systems and methods described herein can be incorporated into any ground-borne, airborne, or waterborne vehicle, including those ranging from vehicles that need to be manually controlled by a driver at all times, to those that are partially or fully autonomously controlled. In additional implementations, techniques described herein may be useful in settings other than vehicles. The techniques described in this specification may be useful in many different applications in which sensor data is used to determine information about objects in an environment.

The vehicle 102 may include a plurality of sensors, including a first radar sensor 108 and a second radar sensor 110. As illustrated, the first radar sensor 108 and the second radar sensor 110 are arranged to propagate waves generally in a direction of travel of the vehicle 102. As also illustrated, the first radar sensor 108 and the second radar sensor 110 have overlapping fields of view. Accordingly, first emitted radio waves 112, emitted by the first radar sensor 108, will reflect off the second vehicle 106 and return to the first radar sensor 108 where they are detected via a first radar scan. Similarly, second emitted radio waves 114, emitted by the second radar sensor 110, will also reflect off the second vehicle 106 and return to the second radar sensor 110 where they are detected via a second radar scan. In some examples, the first radar sensor 108 and the second radar sensor 110 may be substantially identical, except for their position on the vehicle 102. In other examples, however, the radar sensors 108, 110 may be differently configured. By way of non-limiting example, the radio waves 112, 114 may be emitted at different frequencies, e.g. pulse-regulated frequencies. Also in examples, the radar sensors 108, 110 may be configured such that scans at the sensors 108, 110 have a different interval, e.g., a Doppler interval. In examples, features of the radar sensors 108, 110, including but not limited to the center frequency, the scan type, the scan pattern, frequency modulation, the pulse repetition frequency, pulse repetition interval, may be configured, e.g., to create the different Doppler intervals. Accordingly, the radar sensors 108, 110 may both be disposed to sense objects generally in the same direction relative to the vehicle 102, but the radar sensors 108, 110 can be configured differently. In other examples, however, several features and functions of the radar sensors 108, 110 may be the same or similar.

The sensors 108, 110 may receive the radio waves 112, 114 after the waves reflect off a surface in the environment, and the radar sensors 108, 110 can generate radar data based on the reflection. For instance, the radar data may include diverse types of information, including but not limited to a velocity associated with each of many points representative of surfaces or objects in the environment of the sensor. For example, when the sensors 108, 110 are pulse-Doppler sensors, the sensors 108, 110 may be able to determine a velocity of an object relative to the respective sensor.

In more detail, FIG. 1 illustrates a plurality of first radar returns, schematically represented by points. In the illustration, first points 116(1), 116(2), 116(3), 116(4) (collectively, the first points 116) are illustrated as circles, and represent radar returns associated with the first radar sensor 108. That is, individual of the first points 116 are indicative of locations on the second vehicle 106 at which the first emitted waves 112 reflect. Similarly, second points 118(1), 118(2), 118(3), 118(4) (collectively the second points 118) are illustrated as "X"s, and represent radar returns associated with the second radar sensor 110. Stated differently, individual of the second points 118 are indicative of locations on the second vehicle 106 at which the second emitted waves 114 reflect.

As noted above, the first radar sensor 108 and the second radar sensor 110 (also illustrated in the block diagram accompanying FIG. 1 as sensor systems 120) generate data from radio waves reflected from each of the points 116, 118. More specifically, the first radar sensor 108 generates first radar data 122 and the second radar sensor 110 generates second radar data 124. In examples, the radar data 122, 124 includes position data of the respective points 116, 118. For example, information associated with radar returns from the points 116, 118 may include information indicative of a location in the environment, e.g., a location of the points 116, 118. Moreover, when such points are associated with the second vehicle 106, as in the illustration, a position of the second vehicle 106 can be determined. The location information may include a range and azimuth relative to the points 116, 118 or a position in a local or global coordinate system. Also in implementations, the first radar data 122 generated by the first radar sensor 108 and/or the second radar data 124 generated by the second radar sensor 110 may include signal strength information. For example, the signal strength information can indicate a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. In some instances, the signal strength may include a radar cross-section (RCS) measurement. As also noted above, the first radar sensor data 122 and/or the second radar data 124 may also include velocity information. For instance, a velocity of each of the points 116, 118 (and/or of the second vehicle 106) may be based on a frequency of radio energy reflected from the points 116, 118 and/or a time at which the reflected radio energy is detected.

Accordingly, the first radar data 122 can include a distance of the respective one of the first points 116 from the first radar sensor 108 (e.g., a range or radial distance), a velocity (e.g., a Doppler velocity) of the respective one of the first points 116 along the distance, a strength measurement (e.g., an RCS value), and/or additional information. Similarly, the second radar data 124 can include a distance of the respective one of the second points 118 from the second radar sensor 110 (e.g., a range or radial distance), a velocity (e.g., a Doppler velocity) of the respective one of the second points 118 along the associated distance, strength information, and/or additional information.

In examples described herein, the different types of information contained in the first radar data 122 and the second radar data 124 can be used to determine additional information. For instance, FIG. 1 also illustrates that the vehicle 102 can include one or more vehicle computing device(s) 126 including a yaw rate and two-dimensional velocity determination component 128. The yaw rate and two-dimensional velocity determination component 128 can be configured to receive the first radar data 122 and the second radar data 124 and determine a yaw rate and two-dimensional velocity of the second vehicle 106. In the example of FIG. 1, the second vehicle 106 can have a center of rotation 130 and the yaw rate and two-dimensional velocity determination component 128 can determine a yaw rate 132 of the second vehicle 106 about the center of rotation 130. For example, and as described further herein, the yaw rate and two-dimensional velocity determination component 128 can assume that the second vehicle 106 is a fixed rigid body, and project the velocities associated with each of the first points 116 and the second points 118 onto the center of rotation 130 to estimate the yaw rate. Conceptually, the yaw rate and two-dimensional velocity determination component 128 can treat each of the velocities as dependent upon some rotation on the second vehicle 106, at a distance from the center of rotation. For instance, because the position of each of the points 116, 118 is known, as is a position of the center of rotation 130, the yaw rate and two-dimensional velocity determination component 128 can compute the yaw rate 132 about the center of rotation using the velocity and relative positions. Moreover, because the yaw rate and two-dimensional velocity determination component 128 can assume that the second vehicle 106 is a fixed rigid body, the yaw rate 132 is the same regardless of the position of the center of rotation 130. Accordingly, any one of the first points 116 or the second points 118 can be used as the center of rotation. Additional details about the functioning of the yaw rate and two-dimensional velocity determination component 128 are described below in connection with FIGS. 2 and 3. As also described herein, the yaw rate and two-dimensional velocity determination component 128 can determine a two-dimensional velocity of the second vehicle 106, e.g., based on the return velocity and positions of the center of rotation 130, the sensors 108, 110, and the return.

In examples, the yaw rate and two-dimensional velocity determination component 128 can determine the yaw rate 132 because each of the points 116, 118 is on the rigid body (e.g., associated with the second vehicle 106). For simplicity, FIG. 1 shows only the second vehicle 106, and the first points 116 and the second points 118 all are reflected off the second vehicle 106. However, the radar sensors 108, 110 generally receive reflections from a number of different objects in the environment, including but not limited to other vehicles, buildings, fixtures, surfaces, pedestrians, bicyclists, and/or the like.

Accordingly, in examples, the vehicle computing device(s) 126 can further include a data association component 134. For example, the data association component 134 can include functionality to associate returns with each other and/or with specific objects. Thus, for example, the data association component 134 can determine that returns associated with the first points 116 and the second points 118 are associated with each other and/or with the second vehicle 106. The data association component 134 can also determine that other returns, e.g., in a same radar scan, are associated with other objects, for example, the road surface 104 proximate the second vehicle 106, other vehicles (not shown), or the like.

In some examples, the data association component 134 can cluster points, e.g., the first points 116 and the second points 118, based on information from those returns. For instance, the first points 116 and the second points 118 are closely situated, e.g., within a threshold distance, and in some instances the data association component 134 can estimate that those points are indicative of a single object. In examples described herein, a point cluster may include a plurality of points that have some likelihood, e.g., a level and/or degree of similarity, to identify a single object or grouping of objects that should be considered together, e.g., by a planning system of the autonomous vehicle. In aspects of this disclosure, information in addition to position information may be used to determine the point cluster. For example, while the first points 116 and the second points 118 have similar positional returns, in some implementations other points that are also close in proximity can be excluded by the data association component 134, e.g., because such points may be representative of a different object. For instance, the signal strength, e.g., the RCS value, associated with an additional point 136 may be significantly different than the signal strength associated with the first points 116 and/or the second points 118. This despite the additional point 136 being physically closer to the second point 118(4) than several of the first points 116 and/or the second points 118. In a real-world example, if a person is standing next to a fire hydrant, the returns from the fire hydrant could have a significantly stronger signal, e.g., because the fire hydrant is metal, than the returns from the person. In the illustrated example, the additional point 136 may be associated with the road surface 104, some debris on the road surface 104, or the like. As will be appreciated, associating the additional point 136 with the object could negatively impact functioning of the yaw rate and two-dimensional velocity determination component 128, e.g., because the velocity of the additional point 136 may be quite different from the velocity of the second vehicle 106.

The data association component 134 can use additional or different information to determine returns associated with objects. For example, when the radar sensor is a Doppler-type sensor, velocity of the objects may be used to determine the point cluster. In the illustrated example, when the additional point 136 is associated with the road and the second vehicle 106 is moving, the velocities associated with the radar returns may be sufficiently different to allow for proper clustering of returns. More specifically, because the road surface is stationary and the vehicle is moving, points having a similar, non-zero velocity component can be clustered as the second vehicle. Other information may also or alternatively be used to cluster points in accordance with the disclosure herein, and the examples provided are for illustration only. By way of non-limiting example, historical data of the object, e.g., of the second vehicle 106, can be used to determine whether points are associated with the object. For instance, if tracking data of an object provides historical position, velocity and/or acceleration data, the data association component 134 may expect more recent, e.g., contemporaneous, returns associated with the object to have values within some range.

In some examples, the data association component 134 can also add points to already existing clusters. For instance, later-in-time returns can be associated with object clusters based on a distance, e.g., a Euclidian distance from points already in the cluster. The data association component 134 can also add new returns to a cluster returns when a value, e.g., a signal strength, falls between a minimum signal strength and a maximum signal strength of points already associated with an object. Inclusion in a cluster can also be based on a proximity e.g., by location data, of later received points to points already in a cluster (e.g. a number of nearest neighbors (1, 2, or more)). Clustering may be performed based on any physical parameters associated with the points (including, but not limited to, velocities, signal strength, location, nearest neighbors, a time stamp the measurement was performed, etc.), as well as corresponding threshold differences in any of the aforementioned parameters. Inclusion may also be based on a combination of these and other information.

In at least some examples, the data association component 134 can determine association of radar returns with an object based on one or more additional sensor modalities. As non-limiting examples, objects in the environment, such as the second vehicle 106, may be determined based on any one or more of lidar data from one or more lidar sensors (which may include time of flight sensors), image data from any number of cameras, and the like, or any combination thereof. In such examples, the radar data may be associated with the detection from any one or more of the other modalities in order to determine which radar data is generated based on reflections from the second vehicle 106. In some examples, previously determined positions of objects in an environment and/or their associated and determined dynamics (trajectories, velocities, accelerations, yaw rates, etc.) may be used to form an estimate of where the object may likely be (e.g., using a Kalman, or other Bayesian, filter). These object tracks may then be used to perform data association with the newly collected data to determine where the object is currently.

As noted, the data association component 134 can include functionality to determine returns associated with an object, and the yaw rate and two-dimensional velocity determination component 128 can use information (e.g., position and velocity) associated with those returns to determine a yaw rate and/or the two-dimensional velocity for that object. In examples, the vehicle 102 can include functionality to control the vehicle 102, and the yaw rate 132 and/or the two-dimensional velocity of the second vehicle 106 can be used by the vehicle to travel relative to the second vehicle 106. For instance, the yaw rate 132 and/or the two-dimensional velocity may be a factor used to predict a path or trajectory of the second vehicle 106, and a planning system of the vehicle 102 may use that prediction information to determine a drive path for the vehicle 102, to avoid the predicted path/trajectory. As a non-limiting example, in the illustration, a yaw rate may provide a better indication as to whether the second vehicle 106 is entering the lane of travel of the vehicle 102, or likely to proceed in its current lane.

Techniques described herein may improve planning system accuracy and performance by determining yaw rates of objects in the environment quickly and accurately. For instance, radar sensors, like the radar sensor 108, 110 are among the fastest sensors on some vehicles to generate meaningful amounts of data about objects, like the second vehicle 106. By generating a yaw rate and/or a two-dimensional velocity, in some instances only from the radar data 122, 124, attributes of the second vehicle 106 can be obtained more quickly and reliably, thereby improving reliability and timeliness of subsequent predictions based on such radar data.

Figure 2:
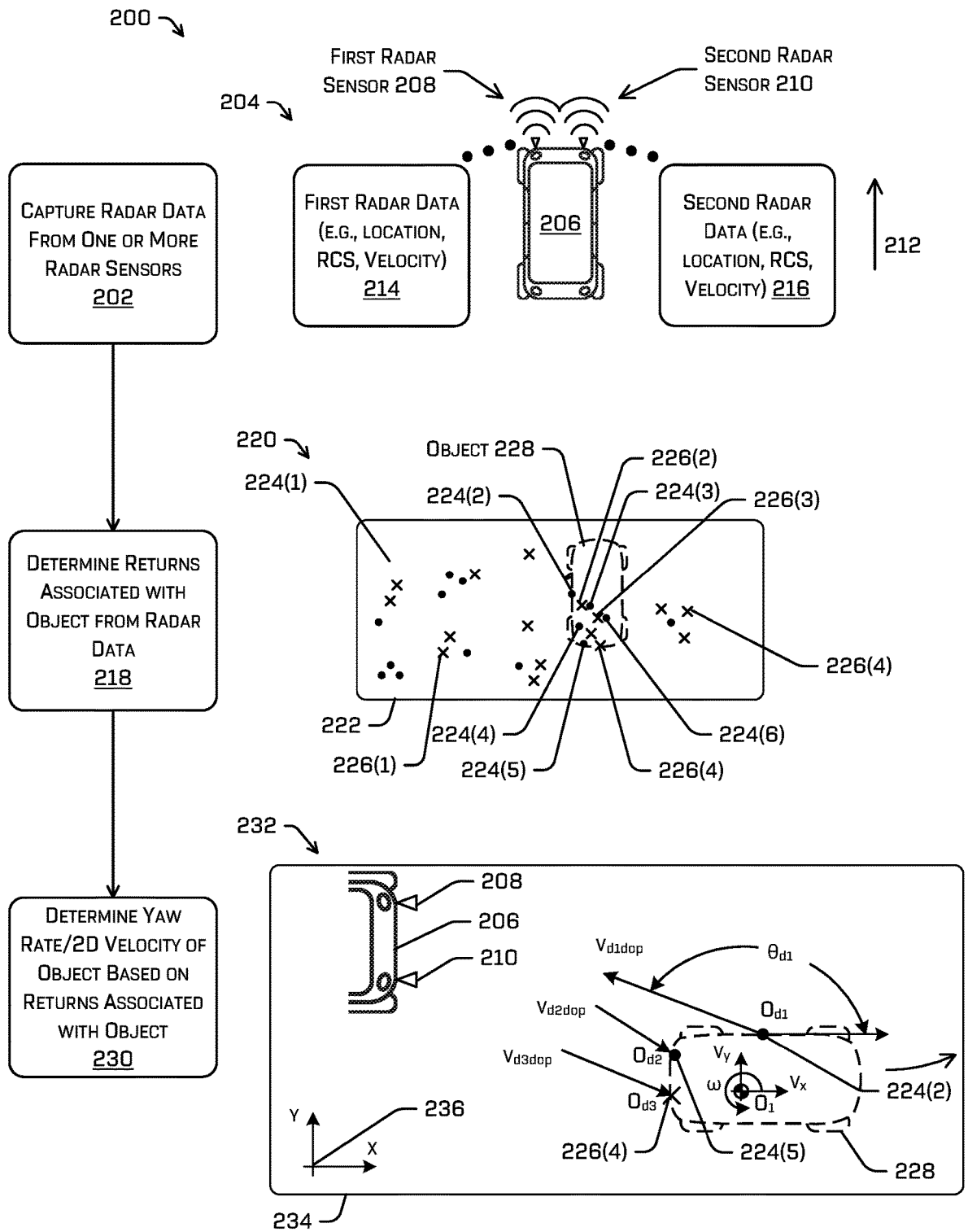
FIG. 2 includes textual and visual flowcharts to illustrate an example method for determining a yaw rate of an object from radar data generated by radar sensors on a vehicle, as described herein.

FIG. 2 includes textual and visual flowcharts to illustrate an example process 200 for determining a yaw rate and/or a two-dimensional velocity of an object based on sensor data. In examples described herein, the sensor data may be obtained by radar sensors disposed on an autonomous vehicle. In this example, the process 200 uses multiple radar sensors with overlapping fields of view to determine a point cluster indicative of an object in the environment of the autonomous vehicle and then determines a yaw rate based on the clustered radar returns.

At operation 202, the process 200 can include capturing radar data from one or more radar sensors disposed on an autonomous vehicle. As will be appreciated from the disclosure herein, any number of radar sensors having overlapping fields of view can use the techniques described herein. An example 204 accompanying the operation 202 illustrates a vehicle 206 having a first radar sensor 208 and a second radar sensor 210 disposed on the vehicle 206. In the illustrated example, the vehicle 206 may be traversing through the environment generally in a direction indicated by an arrow 212 (although in other implementations, the vehicle 206 may be stationary or moving in a different direction), such that the first radar sensor 208 and the second radar sensor 210 are disposed on the leading end of the vehicle 206, e.g., to capture data about objects in front of the vehicle 206. More specifically, the first radar sensor 208 captures first radar data 214, e.g., via first radar scans, and the second radar sensor 210 captures second radar data 216, e.g., via second radar scans. In the illustrated embodiment, the first and second radar sensors 208, 210 are generally configured next to each other, both facing in the direction of travel, and with significant overlap in their fields of view.

In examples, the vehicle 206 may correspond to the vehicle 106 and the first radar sensor 208 and the second radar sensor 210 may correspond to the first and second radar sensors 108, 110, shown in, and discussed in connection with, FIG. 1. The first radar sensor 208 and the second radar sensor 210 may be radar sensors that measure the range to objects and/or the velocity of objects. In some example systems, the radar sensors may be Doppler sensors, pulse-type sensors, continuous wave frequency modulation (CWFM) sensors, or the like. For example, the radar sensors 208, 210 may emit pulses of radio energy at predetermined (and in some instances, configurable) intervals. In some implementations, the intervals may be configurable, e.g., to promote enhanced detection of objects at relatively far distances or relatively close distances. The pulses of radio energy reflect off objects in the environment and can be received by the radar sensors 208, 210, e.g., as the first radar data 214 and the second radar data 216. The frequency with which the radar returns are read out may also be configurable, in some examples.

In some example implementations, the first radar data 214 and/or the second radar data 216 may include position information indicative of a location of objects in the environment, e.g., a range and azimuth relative to the vehicle 206 or a position in a local or global coordinate system. The first sensor data 214 and/or the second sensor data 216 may also include signal strength information. For example, the signal strength information may be an indication of a type or composition of the surface from which the radio waves are reflected. In some instances, the signal strength may be a radar cross-section (RCS) measurement. The first sensor data 214 and/or the second sensor data 216 may also include velocity information. For instance, velocity of the object may be based on a frequency of radio energy reflected by the object and/or a time at which the reflected radio energy is detected. The first and second radar sensor data 214, 216 may also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, or the like. In some implementations, certain types of the radar sensor data 214, 216 may be pre-configured, e.g., the field of view, the orientation, the PRF or PM, or the like, in which case that data may be available to the autonomous vehicle 206 computing system, and may not be transferred with radar returns, for example.

At operation 218, the process 200 can determine returns associated with an object from the radar data. An example 220 accompanying the operation 218 includes a visualization 222 of the first radar data 214 and the second radar data 216. More specifically, the visualization 222 includes a plurality of points which may be representative of objects, surfaces, or other reflective items, in an environment of the vehicle 206. As illustrated, some circular points are labelled with reference numerals 224(1), 224(2), 224(3), 224(4), 224(5), 224(6) (hereinafter all of the circular points, whether or not labelled in FIG. 2, may be referred to, collectively, as "the first points 224"). In the example, each of the first points 224 may correspond to a radio wave detected at the first radar sensor 208, e.g., after reflecting off some object in front of the vehicle 206. As also illustrated, some points designated by an "x" are labelled with reference numerals 226(1), 226(2), 226(3), 226(4), 226(5) (hereinafter all of the "x" points, whether or not labelled in FIG. 2, may be referred to, collectively, as "the second points 226"). In the example 220, each of the second points 226 may correspond to a radio wave detected at the second radar sensor 210, e.g., after reflecting off some object in front of the vehicle. In the visualization 222, the positions of the detected first points 224 and the detected second points 226 may generally correspond to a position of one or more detected objects or surfaces, e.g., objects (or surfaces) from which the emitted radio wave reflected. As will be appreciated, the first and second radar sensors 208, 210 may receive and/or generate several types of information about the environment, so the visualization 222 could include more or less information; the visualization 222 is merely for explanatory purposes.

The visualization 222 illustrates that some of the points appear to be close in location, and as such, may be associated with a single object. For example, the points 224(2)-224(6) and the points 226(2)-226(4) are closely situated, e.g., within a threshold distance, and in some instances those points may be estimated to be indicative of a single object, such as an object 228. For example, the data association component 134 may determine that the first points 224(2)-224(6) and the second points 226(2)-226(4) could be identified as a point cluster representative of the object 228. In examples described herein, and as discussed above, a point cluster may include a plurality of points that have some likelihood, e.g., a level and/or degree of similarity, to identify a single object or grouping of objects that should be considered together, e.g., by a planning system of the autonomous vehicle. In aspects of this disclosure, and as detailed above in connection with the data association component 134, information in addition to position information may be used to determine the point cluster. Moreover, the data association component 134 can consider historical information, e.g., track information for the vehicle 206 and/or the object 228 to properly associate the radar returns with the object 228.

Accordingly, in implementations of this disclosure, the operation 218, e.g., implemented by the data association component 134, can determine returns representative of the object 228, e.g., because the points may be clustered based on one or more diverse types of information, and because sensor data from multiple scans and/or radar sensors is used to create the cluster. In the illustrated example, the object 228 may be the second vehicle 106. In the example of FIG. 2, the object 228 is identified using sensor data from two radar sensors 208, 210. However, in alternate implementations of this disclosure, fewer or more sensors may be used. For example, a point cluster according to the foregoing techniques may be obtained for two scans (e.g., subscans as above) from the same sensor, e.g., in instances in which the scans are within a threshold time, e.g., 100 milliseconds or less. So long as the sensors are disposed to capture information about the same object, techniques described herein may be applied. Moreover, scans from the same sensor can be used in techniques described herein, e.g., by normalizing or synchronizing returns from multiple scans using information about the object 228 and/or the vehicle 206. For example, FIG. 3, discussed below, shows an example process for synchronizing radar data, such as the first radar data 214 and/or the second radar data 216, based on timestamps and historical information. Moreover, although the example implementation is discussed with reference to radar sensors, other sensor modalities, like sonar and/or LiDAR may also benefit from techniques described herein.

At operation 230, the process 200 can determine a yaw rate and/or a two-dimensional velocity of the object based on returns associated with the object. An example 232 accompanying the operation 230 includes a visualization 234 including the vehicle 206 (with the first radar sensor 208 and the second radar sensor 210) and three of the points 224(2), 224(5), 226(4) associated with the object 228. In this example, the object 228 may be the second vehicle 106 of FIG. 1 (and the vehicle 206 may be the vehicle 102). The visualization 234 also illustrates a coordinate system 236.

In the visualization 234, for clarity of representation, the first point 224(2) is represented as a first detected point $O_{d1}$, the first point 224(5) is represented as a second detected point $O_{d2}$, and the second point 226(4) is represented as a third detected point $O_{d3}$. Although only the three detected points from the radar data 214, 216 are illustrated in the example 232, the techniques described herein can use any and all returns associated with the object 228. As illustrated, the object 228 may have a center of rotation $O_1$, and movement of the object 228 may be characterized by a velocity in the x-direction, e.g., a velocity $v_x$, a velocity in the y-direction, e.g., a velocity $v_y$, and a yaw rate ω about the center of rotation $O_1$. In examples, the center of rotation $O_1$ may be selected arbitrarily. For example, and as discussed above, in some examples the object 228 can be treated as a rigid body, which means that the yaw rate will be the same at any point on the body. Thus, while the center of rotation $O_1$ is illustrated as generally centrally located on the object 228 (and spaced from the points 224, 226), in other examples any point can be used, including but not limited to one of the points 224, 226.

By considering the object 228 as a rigid body, techniques described herein, e.g., which may be implemented using the yaw rate and two-dimensional velocity determination component 128, can estimate the yaw rate and/or the of the object 228 using multiple returns. In the illustrated example 232, the position of the first detected point $O_{d1}$, the position of the first radar sensor 208 (which generated the return associated with the first point $O_{d1}$) and the position of the center of rotation $O_1$ all are known. Similarly, the positions of the second detected point $O_{d2}$ and of the third return $O_{d3}$ also are known, as is the position of the second radar sensor 210 (which generated the return associated with the third point $O_{d3}$). Moreover, each of the first detected point $O_{d1}$, the second detected point $O_{d2}$, and the third detected point $O_{d3}$ has an associated velocity, e.g., a doppler velocity. Such velocities are illustrated in the example as $V_{d1dop}$, $V_{d2dop}$, and $V_{d3dop}$, respectively. Such velocities are velocities along the direction between the point and the sensor sensing the velocity. For example, $V_{d2dop}$ is a velocity along a direction from the first detected point $O_{d1}$ to the first radar sensor 208, $V_{d2dop}$ is a velocity along a direction from the second detected point $O_{d2}$ to the first radar sensor 208, and $V_{d3dop}$ is a velocity along a direction from the third detected point $O_{d3}$ to the second radar sensor 210. As will be appreciated, the directions of the velocities $V_{d1dop}$, $V_{d2dop}$, and $V_{d3dop}$ indicate that the object 228 is moving counter-clockwise about the center of rotation $O_1$.

Given a plurality of points, e.g., the first through third detected points, the operation 230 can include solving Equation (1):

$$v_x \cos\theta_{dn} + v_y \sin\theta_{dn} + \omega\left(\frac{\overrightarrow{O_1 O_{dn}} \cdot \overrightarrow{O_{dn} O_{Rm}}}{|\overrightarrow{O_{dn} O_{Rm}}|}\right) = v_{dndop} \qquad (1)$$

As illustrated, Equation (1) includes three unknowns ($v_x$, $v_y$, ω), which describe movement of the object in the x,y plane. In examples, the operation 230 can include simultaneously solving Equation (1) for each of n returns associated with the object and measured by m sensors. For instance, Equation (1) can be solved simultaneously for the three points included in FIG. 2 and/or any other returns associated with the object, and captured by the two sensors 208, 210. In Equation (1), $O_{Rm}$ indicates a position of the radar sensor m that captured the return n. As will also be appreciated, because the center of rotation $O_1$ is arbitrarily determined in examples described herein, in some examples Equation (1) can be parameterized to also solve for the center of rotation.

To illustrate further, Equation (1) for the point $O_{d1}$ in FIG. 2, would be re-written as Equation (2):

$$v_x \cos\theta_{d1} + v_y \sin\theta_{d1} + \omega \left( \frac{\overrightarrow{O_1 O_{d1}} \cdot \overrightarrow{O_{d1} O_{R1}}}{|\overrightarrow{O_{d1} O_{R1}}|} \right) = v_{d1dop} \quad (2)$$

Conceptually, Equation (2) describes a projection of the doppler velocity associated with the first detected point $O_{d1}$ onto the center of rotation. Stated differently, the received doppler velocity is equal to some proportion of the velocity in the x and y direction and the impact caused by the rotation about the center for rotation. Thus, the first term represents a velocity in the x-direction, scaled according to the angle, at the first detected point $O_{d1}$, the second term represents a velocity in the y-direction, the first detected point $O_{d1}$, and the third term represents the (rotational) impact of the velocities on the center of rotation. Specifically, the third term illustrates the product of a distance between the center of rotation $O_1$ and the first detected point $O_{d1}$ and a unit vector extending from the first detected point $O_{d1}$ toward the position of the radar sensor.

As noted above, Equation (1) can be solved simultaneously using all points associated with the object 228, e.g., using a single matrix. For instance, Equation (1) can be solved using an iterative estimation technique. In some instances, a least-squares estimation of the three unknowns can be used. In some instances, solving a least squares estimation may require more than three returns, e.g., because three radar returns may not provide a unique solution for each of the unknowns. Also in examples, the estimation may benefit from random sample consensus (RANSAC) methods. For instance, RANSAC logic can perform a robust estimation by rejecting outliers in a relatively large data set. By way of non-limiting example, RANSAC methods may reject returns that were originally associated with the object 228, e.g., by the data association component 134, but that are not actually from the object 228. For instance, the RANSAC methods can reject returns from the ground proximate the object 228. Of course, this disclosure is not limited to using RANSAC for outlier rejection. Other techniques, including but not limited to iterative least squares, can alternatively be used.

According to techniques described herein, a yaw rate, e.g., an instantaneous yaw rate, and an instantaneously two-dimensional velocity, can be determined for an object 228 based on radar data associated with the object 228. In some examples, the yaw rate and/or the two-dimensional velocity may be used to predict a trajectory or path of the object 228. For example, the vehicle 206 may then plan a path that avoids the predicted trajectory/path of the object 228, e.g., for safe navigation. As discussed above, some examples can use as few as three returns to determine the yaw rate, although other examples may use as many returns as are available for the object 228.

Figure 3:
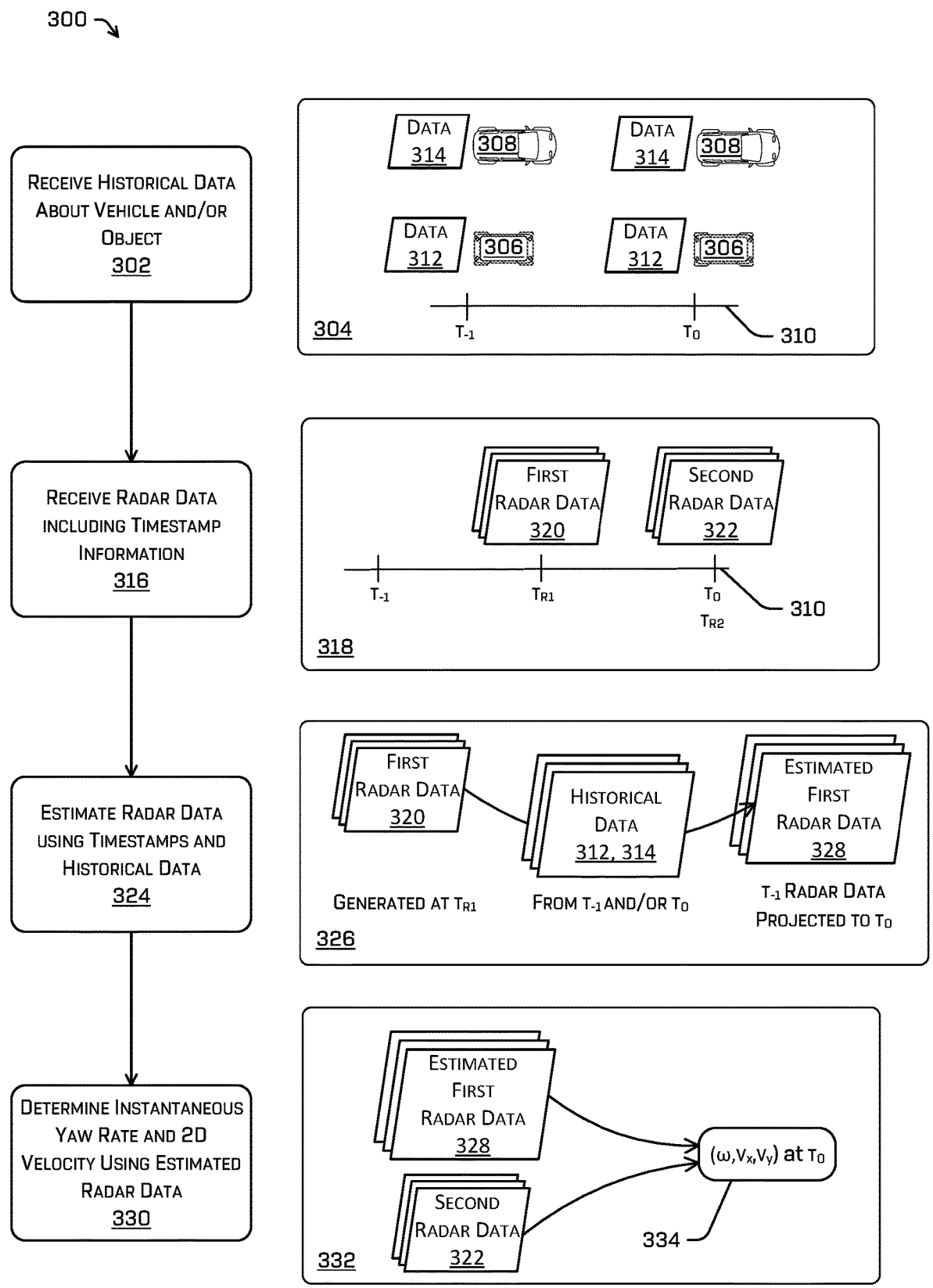
FIG. 3 includes textual and visual flowcharts to illustrate an example method for determining a yaw rate of an object from radar data generated by radar sensors on a vehicle, as described herein.

FIG. 3 includes textual and visual flowcharts to illustrate an example process 300 for updating sensor data, e.g., radar sensor data, for use in yaw rate determination. For instance, the process 300 can be implemented on radar sensor data to prepare such radar sensor data for use in the process 200, although the process 300 need not be used in connection with the process 200, and, as described above, the process 200 may be implemented without techniques discussed in connection with the process 300.

At an operation 302, the process 300 can include receiving historical data about a vehicle and/or an object. An example 304 accompanying the operation 302 illustrates historical information about a vehicle 306, which may be an autonomous vehicle (e.g., the vehicle 102 and/or the vehicle 206), e.g., on which one or more sensors, such as the radar sensors 108, 110 may be mounted. The historical information may also include historical information about an object 308, which can be an object in an environment of the vehicle 306. In some instances, the object 308 can be the second vehicle 106 and/or the object 228 described herein. The example 304 includes a timeline 310, indicating a plurality of times, e.g., $T_0$, $T_{-1}$ and illustrates that data 312 is associated with the vehicle 306 at each of the illustrated times and that data 314 is associated with the object 308 at each of the illustrated times. The two times are for illustration only, as the data 312, 314 can be generated and/or determined at any number of times and/or frequencies. Moreover, the data 312 may be generated (or captured) at time intervals different from those at which the data 314 may be generated (or captured).

In examples, the data 312 and the data 314 may include any information about the vehicle 306 and the object 308, respectively. For example, the data 312 and/or the data 314 may be state data about the vehicle/object at the specific time. The data 312 and/or the data 314 can include position and/or orientation data, e.g., any one or more of an x,y,z position in a coordinate system and/or a roll/pitch/yaw, of the vehicle 306 and/or the object 308. Thus, for instance, the data 312 at time $T_{-1}$ may identify a position of the vehicle 306 at that time, whereas the data 312 associated with the time $T_0$ may identify a current (or most-recently detected) position of the vehicle 306. In other implementations, the data 312 and/or the data 314 can include velocity information, acceleration information, and/or any other information associated with the vehicle 306 and/or the object 308 at the given times (e.g., including, but not limited to, an estimated center of the object, estimated extents of the object—length, width, height, predicted trajectories, associated confidence levels of any of the above, and the like). In at least some examples, the data 312 and/or the data 314 can include state velocity of the vehicle at the given times. The data 312 and/or the data 314 can also include tracking data about the respective vehicle 306 or the object 308.

At operation 316, the process 300 can include receiving radar data including timestamp information. In an example 318 accompanying the operation 316, the timeline 310 is illustrated, and an instance of first radar data 320 and an instance of second radar data 322 are illustrated on the timeline 310. In some examples, the first radar data 320 can correspond to the first radar data 122 and/or the first radar data 214 and the second radar data 322 can correspond to the second radar data 124 and/or the second radar data 216. In examples, the first radar data 320 may be captured by a first radar sensor disposed on the vehicle 306 and the second radar data 322 may be captured by a second radar sensor disposed on the vehicle 306. Also in implementations, the first radar data 320 and the second radar data 322 can include radar returns corresponding to overlapping fields of view. Thus, both the first radar data 320 and the second radar data 322 may include radar returns associated with the object 308. In the illustrated examples, the first radar data 320 is associated with (e.g., generated, output, or the like) a first time $T_{R1}$, which is between the times $T_{-1}$ and $T_0$, and the second radar data 322 is associated with (e.g., generated at, output by the sensor at, or the like) a second time $T_{R2}$ which generally coincides with the time $T_0$. The times associated with the first radar data 320 and/or the second radar data 322 may be determined from timestamps associated with one or more returns comprising the respective data, and are for illustration only.

At operation 324, the process 300 can include estimating radar data using the timestamp information and the historical data. In an example 326 accompanying the operation 324, the first radar data 320, generated at the time $T_{R1}$, and the historical data 312, 314 associated with the time $T_{-1}$ and/or the time $T_0$ may be used to generate estimated first radar data 328. For example, the estimated first radar data may be a projection or prediction of the returns captured at $T_{R1}$ to a different, e.g., present or most-recent time. For example, using attributes of the vehicle 306 and the object 308 at the times $T_0$ and/or $T_{-1}$, techniques described herein can determine an effect the changes would have on the radar return. Consider an example in which at $T_{-1}$ the object 308 is stationary, but at $T_0$, the vehicle is moving at 2 m/s. When the vehicle 308 has maintained a constant velocity, a radar return associated with the first radar data 320 at time $T_{R1}$ may show a first doppler velocity at a first position. However, that velocity is no longer accurate at time $T_0$, at least because the relative velocity has changed and/or because the position of the object 308 has moved. Accordingly, when the change in velocity and/or position is known from $T_{-1}$ to $T_0$, the return from time $T_{R1}$ can be "projected" to a different time, e.g., time $T_0$, and used together with returns captured at $T_0$. In at least one example, a state velocity, a center of rotation, and/or a state yaw rate, e.g., for a last known state (at $T_0$ in the example) can be used as a basis for determining the projected first radar data 328. Although in the example the second radar is substantially simultaneous with the time $T_0$ at which a state of the vehicle 306 and/or the object 308 are determined, the second radar data 322 may not be projected. However, in other examples, the second radar data 322 can also be normalized or otherwise projected to a more recent time, e.g., as estimated second radar data (not shown). In a similar example, if an object velocity and yaw rate are known at a previous step, a time difference between measurements (e.g., 100 ms) can be used to approximate what the velocities would be in a current time, as if the measurements were made contemporaneously.

At operation 330, the process 300 can include determining an instantaneous yaw rate and/or a two-dimensional velocity using the estimated radar returns. In an example 332 accompanying the operation 330, the estimated first radar data 328 and the second radar data 322 can be used to determine a yaw rate and two-dimensional velocity 334 at the time $T_0$. In the example, because the second radar data 322 is associated with (e.g., generated at) the time $T_0$ and the first radar data 320 has been projected to the time $T_0$, e.g., as the estimated first radar data 328, returns associated with the second radar data 322 and estimated returns associated with the estimated first radar data 328 are normalized to the same time. Accordingly, the techniques described herein can determine the yaw rate and/or two-dimensional velocity to determine parameters associated with the vehicle.

Accordingly, techniques illustrated in FIG. 3 can be used to increase a number of points for consideration in determining a yaw rate and/or two-dimensional velocity, as in the process 200 described above. As noted above, the more points associated with an object, the higher the degree of certainty that may be associated with the calculated yaw rate and/or two-dimensional velocity. Moreover, and as also discussed above, the determination of the yaw rate and/or the two-dimensional velocity from a relatively larger set of returns can provide enhanced outlier rejection, thereby resulting in improved accuracy.

In the illustration of FIG. 3, the first radar data 320 may be a single scan by a first sensor (not shown) and the second radar data 322 may be a second scan by a second sensor (not shown). In examples, the scans may be the closest-in-time scans from the respective sensors, and the parameters, e.g., the yaw rate and/or the two-dimensional velocity can be determined using a single return from each sensor. In these examples, the process 300 can be used to normalize the data from the different sensors to a common time. In other examples, the first radar data 320 and the second radar data 322 can be scans by the same sensor. The process 300 described herein can be used to normalize one or more scans from one or more sensors.

Figure 4:
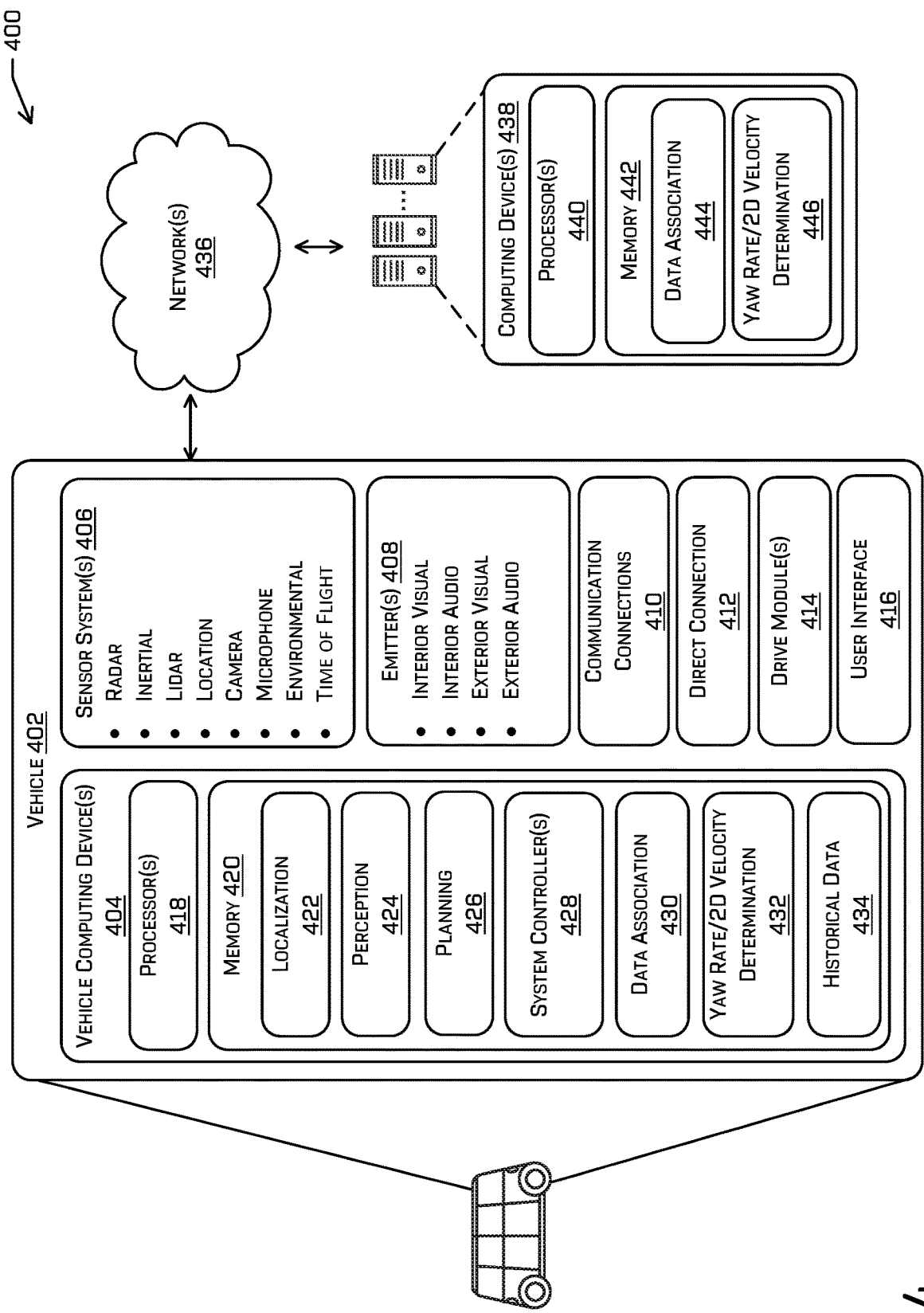
FIG. 4 is a block diagram illustrating an example computing system for generating an instantaneous yaw rate from radar data, as described herein.

FIG. 4 illustrates a block diagram of an example system 400 for implementing the techniques described herein. In at least one example, the system 400 can include a vehicle 402, which can be the same vehicle as the vehicle 102, the vehicle 206, and/or the vehicle 306 described above with reference to FIGS. 1, 2, and 3, respectively.

The vehicle 402 can include one or more vehicle computing devices 404, one or more sensor systems 406, one or more emitters 408, one or more communication connections 410, at least one direct connection 412, one or more drive modules 414, and a user interface 416.

The vehicle computing device(s) 404 can include one or more processors 418 and memory 420 communicatively coupled with the one or more processors 418. In the illustrated example, the vehicle 402 is an autonomous vehicle; however, the vehicle 402 could be any other type of vehicle. In the illustrated example, the memory 420 of the vehicle computing device 404 stores a localization component 422, a perception component 424, a planning component 426, one or more system controllers 428, a data association component 430, a yaw rate and two-dimensional velocity determination component 432, and historical data 434. Though depicted in FIG. 4 as residing in memory 420 for illustrative purposes, it is contemplated that the localization component 422, the perception component 424, the planning component 426, the one or more system controllers 428, the data association component 430, the yaw rate and two-dimensional velocity determination component 432, and/or the historical data 434 can additionally, or alternatively, be accessible to the vehicle 402 (e.g., stored on, or otherwise accessible by, memory remote from the vehicle 402).

In at least one example, the localization component 422 can include functionality to receive data from the sensor system(s) 406 to determine a position and/or orientation of the vehicle 402 (e.g., one or more of an x-, y-, z-position, roll, pitch, or yaw). For example, the localization component 422 can include and/or request/receive a map of an environment and can continuously determine a location and/or orientation of the autonomous vehicle within the map. In some instances, the localization component 422 can utilize SLAM (simultaneous localization and mapping), calibration, localization and mapping, simultaneously techniques, relative SLAM, bundle adjustment, non-linear least squares optimization, or the like to receive image data, LiDAR data, radar data, IMU data, GPS data, wheel encoder data, and the like to accurately determine a location of the autonomous vehicle. In some instances, the localization component 422 can provide data to various components of the vehicle 402 to determine an initial position of an autonomous vehicle for generating a candidate trajectory, as discussed herein.

In some instances, the perception component 424 can include functionality to perform object detection, segmentation, and/or classification. In some examples, the perception component 424 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 424 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. By way of non-limiting example, the perception component 424 may receive yaw rates of entities determined according to techniques described herein.

In general, the planning component 426 can determine a path for the vehicle 402 to follow to traverse through an environment. For example, the planning component 426 can determine various routes and trajectories and various levels of detail. For example, the planning component 426 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 428, which can be configured to control steering, propulsion, braking, safety, emitters, communication, and other systems of the vehicle 402. These system controller(s) 428 can communicate with and/or control corresponding systems of the drive module(s) 414 and/or other components of the vehicle 402.

The data association component 430 can be the data association component 134 detailed above. Generally, the data association component 430 can include functionality to associate points, e.g. from radar scans, with objects to determine a plurality of returns associated with individual objects. For example, the data association component 430 may receive sensor data comprising a plurality of points and information associated with the points. For example, the clustering component may receive position information, signal strength information, velocity information, or the like about points, and determine similarities between the points based on some or all of that information. For example, the data association component 430 may determine points having close positional proximity and a signal strength within a threshold amount of neighboring points are indicative of an object and should be clustered.

In some implementations, the data association component 430 can associate points from a number of scans and/or sensors. Accordingly, the clustering component may include points from the second scan to the cluster based on the criteria described herein. In some implementations, the clustering component may utilize algorithmic processing, e.g., DBSCAN, computer learning processing, e.g., K-means unsupervised learning, and/or additional clustering techniques.

The data association component 430 can also include functionality to associate points with each other and/or with objects based on the historical data 434. For example, the historical data can include one or more previous states or parameters associated with an object, and based on those states/parameters, the data association component 430 can determine that radar returns are likely associated with the object.

The yaw rate and two-dimensional velocity determination component 432 can be the yaw rate and two-dimensional velocity determination component 128, detailed further above. Generally, the yaw rate and two-dimensional velocity determination component 432 can include functionality to determine a yaw rate and/or two-dimensional of an object based a plurality of radar returns associated known to be associated with the object. For instance, the yaw rate and two-dimensional velocity determination component 432 may include functionality to use rigid body properties to estimate dynamics of the body in an x-y plane, e.g., velocity in the x- and y-directions and a rotation about the z-axis (yaw rate).

In examples described herein, the yaw rate and two-dimensional velocity determination component 432 can also include functionality to synchronize radar returns to a common time, e.g., such that radar returns captured at different times can be used to solve for an instantaneous yaw rate. In some examples, the yaw rate and two-dimensional velocity determination component 432 can use the historical data 434, which may be tracking information, for example, to determine one or more previous states of the vehicle 402 and/or of a sensed object, and updated a previous radar return based on such change(s) of state. In at least one example, the historical data 434 may include a most recent state of a sensed object, which may be a most-recent velocity of the sensed object. Radar returns from a time previous to the most recent state can be updated based on the most recent state, e.g., by assuming a constant velocity (for instance, the most-recent state velocity) of the object from the previous state to the most recent state. Updating the previously-acquired radar return may include projecting a new position and/or a new velocity of the return, e.g., to a more recent time.

In at least one example, the sensor system(s) 406 can include the radar sensors described herein. Also in examples, the sensor system(s) 406 can include LiDAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, and as discussed herein, implementations of this disclosure may use multiple scans from multiple sensors, e.g., multiple radar sensors, with overlapping fields of view. Thus, for example, the autonomous vehicle 402 may include a number of radar sensors. In additional examples, the LiDAR sensors can include individual LiDAR sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 436, to the one or more computing device(s) at a particular frequency, after a lapse of a predetermined period of time, in near real-time, etc. In some instances, the historical data 434 can be based at least in part on one or more of the sensor system(s) 406.

The emitter(s) 408 may be configured to emit light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle 402. The emitter(s) 408 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote controllers.

The communications connection(s) 410 can include physical and/or logical interfaces for connecting the vehicle computing device 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 402 can include the drive module(s) 414. In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 414. In some cases, the sensor system(s) 406 on the drive module(s) 414 can overlap or supplement corresponding systems of the vehicle 402 (e.g., the sensor system(s) 406).

The drive module(s) 414 can include many vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) 406 and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In at least one example, the direct connection 412 can provide a physical interface to couple the one or more drive module(s) 414 with the body of the vehicle 402. For example, the direction connection 412 can allow the transfer of energy, fluids, air, data, etc. between the drive module(s) 414 and the vehicle. In some instances, the direct connection 412 can further releasably secure the drive module(s) 414 to the body of the vehicle 402.

The user interface 416 may include one or more devices, buttons and/or control panels via which a passenger can communicate with the vehicle 402. In non-limiting examples, a passenger in the vehicle 402 may control functionality of the vehicle 402 via interaction(s) with the user interface 416. In other examples, the user interface 416 may comprise a microphone configured to receive a verbal or spoken input. Generally, the user interface 416 may provide a means though which a passenger can interface with the vehicle computing device(s) 404.

In at least one example, the vehicle 402 may be in communication, via one or more network(s) 436, with one or more computing device(s) 438. For example, as described herein, the vehicle 402 can communicate with the one or more computing device(s) 438 via the network(s) 436. In some examples, the vehicle 402 can receive control signals from the computing device(s) 438. In other examples, the vehicle 402 can transmit information to the computing device(s) 438.

The computing device(s) 438 may be embodied as a fleet management system. In at least one example, the computing device(s) 438 can include processor(s) 440 and memory 442 communicatively coupled with the processor(s) 440. In the illustrated example, the memory 442 of the computing device(s) 438 stores a data association component 444 and a yaw rate and two-dimensional velocity determination component 446. In at least one example, the data association component 444 can correspond to at least a portion of the data association component 430. For example, the data association component 444 may receive radar data from multiple radar scans and determine point clusters representative of objects in the data. Moreover, the yaw rate and two-dimensional velocity determination component 446 446 can correspond to at least a portion of the yaw rate and two-dimensional velocity determination component 432. For example, the yaw rate and two-dimensional velocity determination component 446 may configure the computing device(s) 438 to determine an instantaneous yaw rate and/or two-dimensional velocity for an object based on radar returns identified by the data association component 444.

FIGS. 2, 3, 5, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
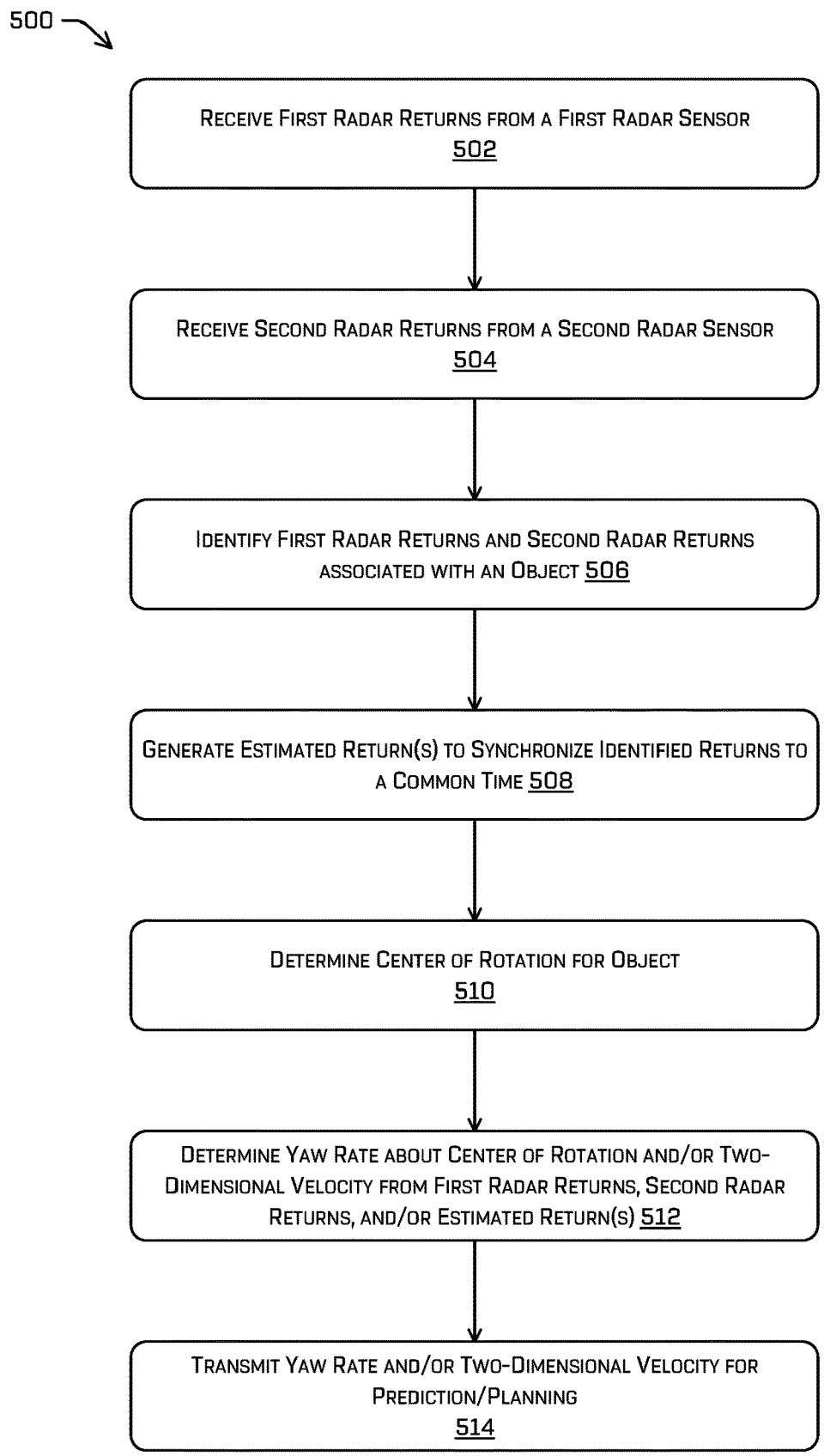
FIG. 5 is a flowchart illustrating an example method for determining a yaw rate from radar data, as described herein.

FIG. 5 depicts an example process 500 for clustering sensor data, such as radar data from multiple radar scans. For example, some or all of the process 500 can be performed by one or more components in FIG. 4, as described herein. For example, some or all of the process 500 can be performed by the data association component 430 and/or the data association component 444 and/or by the yaw rate and two-dimensional velocity determination component 432 and/or the yaw rate and two-dimensional velocity determination component 446.

At operation 502, the process 500 can include receiving first radar returns from a first radar sensor. As described above, the vehicle 402 can include sensor system(s) 406. In at least one example, the sensor system(s) 406 can include a plurality of radar sensors having overlapping fields of view, e.g., to receive radar returns associated with the same objects in an environment of the vehicle 402. The first radar returns can include one or more of position information of objects in an environment of the vehicle 402, velocity information (e.g., a doppler velocity) for the objects, signal strength (e.g., an RCS measurement), or the like.

At operation 504, the process 500 can include receiving second radar data from a second radar sensor. For instance, and as described herein, the second radar sensor can have a field of view that overlaps with the field of view of the first radar sensor. Like the first radar sensor, the second radar sensor can generate, as the second radar data, one or more of position information, velocity information, signal strength information, or the like.

At operation 506, the process 500 can include identifying first radar returns and second radar returns associated with an object. For example, the first radar returns may be a portion of the first radar data and the second radar returns may be a portion of the second radar data. Techniques described herein may use a clustering component, e.g., the data association component 134, 430, 444, to associate returns with objects in the environment. By way of non-limiting example, the data association component(s) can group points based on common velocity, signal strength, position, or any other physical property measured by or otherwise associated with the radar returns. The data association component(s) can also consider historical information, such as previous states and/or tracks of the object and/or the sensors.

At operation 508, the process 500 can include generating estimated return(s) to synchronize identified returns to a common time. For example, the first radar returns, e.g., associated with the first radar data, and the second radar returns, e.g., associated with the second radar data, can be generated at different times. In some examples, the first radar sensor and the second radar sensor may have different scan times, frequencies, or the like, such that the first radar data and the second radar data are not captured at exactly the same time. Also in examples, the first radar data and/or the second radar data can include multiple scans by the respective first radar sensor and/or the second radar sensor. The operation 508 can modify or update relatively older returns, e.g., to synchronize all returns at a common, e.g., most recent time. In at least one example, the operation 508 can use historical data of the vehicle 402 and/or of the object being sensed to project older-in-time returns to a more recent time. In at least some examples, the historical data can include information about positions, velocities, accelerations, yaw, and/or yaw rates associated with the vehicle 402 and/or the sensed object. Using this historical, or tracking, data may allow for additional radar returns to be associated with the sensed object, which, as detailed further herein, can provide a more robust and/or accurate estimation of movement (e.g., yaw rate, two-dimensional velocity) of the sensed object. In some examples, the operation 508 may include techniques like those described above in connection with FIG. 3.

At operation 510, the process 500 can include determining a center of rotation for the object. In examples described herein, a yaw rate can be determined for an object by projecting doppler velocity measurements onto a rotational center of the object. Accordingly, the operation 510 can identify this center of rotation. Because techniques described herein can assume the object is a rigid body, any point on the body can be used as the center of rotation. Accordingly, the center of rotation may be arbitrary. In at least some examples, a location associated with one of the first radar returns or the second radar returns can be determined to be the center of rotation.

At operation 512, the process 500 can include determining a yaw rate about the center of rotation and/or a two-dimensional velocity from the first radar returns, the second radar returns, and/or the estimated return(s). In examples described herein, the yaw rate and two-dimensional velocity determination component 128, 432, 446 can determine a yaw rate of an object based on radar returns associated with the object. For example, the yaw rate and two-dimensional velocity determination component 128, 432, 446 can estimate a solution of Equation (1), about the center of rotation, for all returns associated with the object. In some examples, the inclusion of more points, e.g., points contemporaneous in time as well as the estimated point(s), may provide a more robust estimation of the yaw rate and/or two-dimensional velocity. For instance, the yaw rate and the two-dimensional velocity can be solved using a least squares estimation. Also in examples, RANSAC logic can be used to remove outliers when solving Equation (1) simultaneously for all measured returns.

At operation 514, the process 500 may transmit the yaw rate and/or the two-dimensional velocity for prediction and/or planning. For example, the operation 514 can include sending the yaw rate and/or the two-dimensional velocity of the object to one or more of a perception system (e.g., the perception system 424), a planning system (e.g., the planning system 426), and/or the like. In some instances, the yaw rate and/or the two-dimensional velocity may be used by one or more systems of the vehicle to determine one or more trajectories through the environment and relative to the object.

Figure 6:
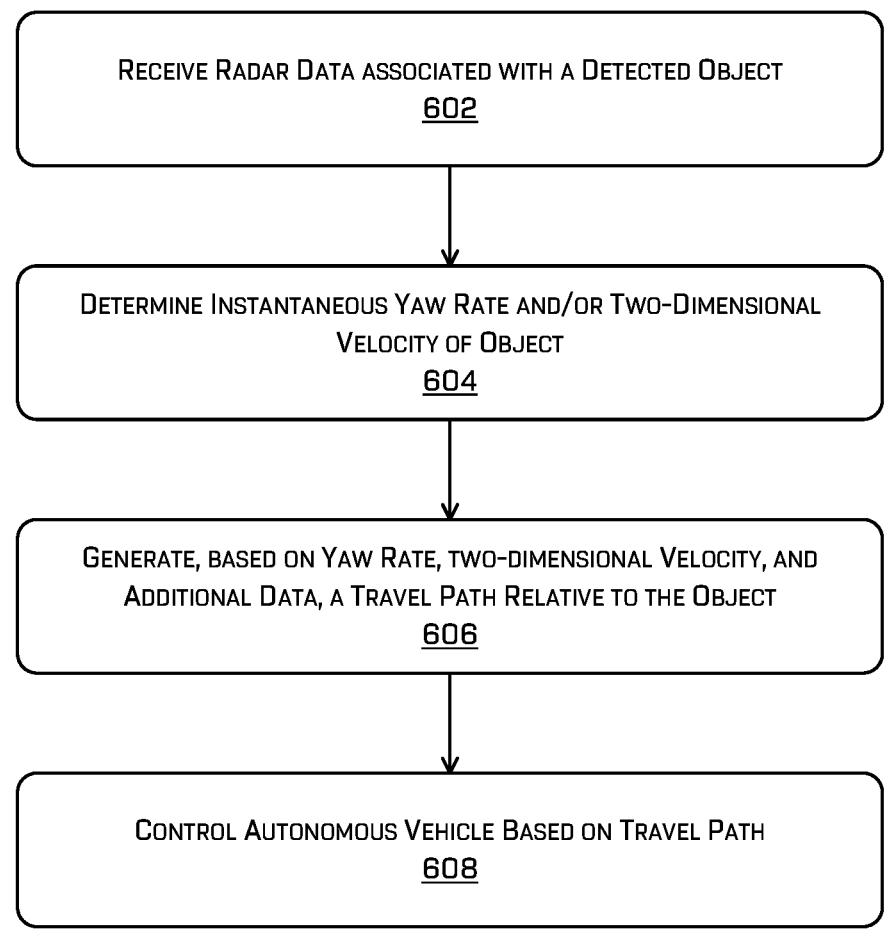
FIG. 6 is a flowchart illustrating an example method for controlling a vehicle, such as an autonomous vehicle, as described herein.

FIG. 6 depicts an example process 600 for controlling an autonomous vehicle based at least in part on a yaw rate of a detected object, as discussed herein. For example, some or all of the process 600 can be performed by one or more components in FIG. 4, as described herein. For example, some or all of the process 600 can be performed by the localization component 422, the perception component 424, the planning component 426, and/or the system controller(s) 428.

At operation 602, the process 600 can include receiving radar data associated with an object. In some instances, the object may be characterized by a point cluster determined using the clustering techniques described herein. Also in examples, the radar data may include a plurality of radar returns from a plurality of radar sensors. In at least one example, the radar data may include at least three and in some instances preferably more than three radar returns. Of the returns, at least one may be from a first radar sensor and one or more of the returns can be from a second radar sensor. In other examples, all returns may be from a same sensor, e.g., from different scans of the same sensor.

At operation 604, the process 600 can include determining an instantaneous yaw rate and/or a two-dimensional velocity of the object. In some instances, the radar returns include position information and velocity, e.g., doppler velocity, information, and such velocities can be projected onto a center of rotation. The yaw rate and/or the two-dimensional velocity can be estimated using Equation (1), e.g., by simultaneously solving Equation (1) for all returns associated with the object to determine the three unknowns, as discussed above. In examples, because the object is assumed to be a rigid body, Equation (1).

At operation 606, the process 600 can include generating, based on the yaw rate, the two-dimensional velocity, and additional data, a travel path relative to the object. For example, the travel path generated the operation 606 may be based at least in part on a predicted motion of the object, e.g., predicted based at least in part on the yaw rate and/or the two-dimensional velocity. In some examples, the additional data can include sensor data from one or more of the sensor system(s) 406.

At operation 608, the process 600 can include controlling an autonomous vehicle to follow the travel path. In some instances, the commands generated in the operation 609 can be relayed to a controller onboard an autonomous vehicle to control the autonomous vehicle to drive the travel path. Although discussed in the context of an autonomous vehicle, the process 600, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example autonomous vehicle includes: a first radar sensor on the vehicle; a second radar sensor on the vehicle; one or more processors; and memory storing processor-executable instructions that, when executed by the one or more processors, cause to vehicle to perform acts comprising: receiving, from the first radar sensor, first radar returns; receiving, from the second radar sensor, second radar returns; determining a subset of radar returns associated with an object in an environment of the autonomous vehicle, the subset of radar returns comprising a plurality of the first radar returns and at least one of the second radar returns and being associated with a time; determining a center of rotation of the object; determining, based on the subset of radar returns, a yaw rate of the object about the center of rotation and a two-dimensional velocity of the object at the time; and generating, based at least in part on the yaw rate, a travel path through the environment relative to the object.

B: The autonomous vehicle of example A, wherein a first radar return of the first radar returns and a second radar return of the second radar returns include timestamp information, the acts further comprising: receiving historical information about at least one of the autonomous vehicle or the object; and determining, based at least in part on the historical information and the timestamp information, estimated radar data for individual of the plurality of radar returns, wherein the yaw rate is determined based at least in part on the estimated radar data.

C: The autonomous vehicle of example A or example B, wherein the time is a first time and the estimated radar data comprises a projection of a velocity from a second time prior to the first time to the first time.

D: The autonomous vehicle of any one of example A through example C, wherein: the first radar returns are associated with a first radar scan captured at the time and the time is a first time, the second radar returns are associated with a second radar scan captured at a second time prior to the first time, the historical information comprises at least one of an object velocity or an object yaw rate at the second time, and determining the estimated radar data comprises: determining an estimated track of the object from the second time to the first time; and estimating at least one of a depth or a velocity of at least one of the second radar returns based at least in part on the estimated track.

E: The autonomous vehicle of any one of example A through example D, wherein the determining the yaw rate comprises: determining, for a return of the subset of radar returns, a first distance between a position associated with the return and the first radar sensor or the second radar sensor; and determining, for the return, a second distance between the first position and a second position associated with the center of rotation; wherein the yaw rate is based at least in part on a projection of a velocity along the second distance over the first distance.

F: The autonomous vehicle of any one of example A through example E, wherein the generating the travel path includes generating a predicted motion of the object based at least in part on the yaw rate, the acts further comprising: controlling the vehicle to travel along the travel path.

G: An example method comprising: receiving radar returns from at least one radar sensor, the radar returns including information about a first distance to the at least one radar sensor; determining a subset of the radar returns associated with an object; for individual returns of the subset of the radar returns, determining a second distance from a location associated with the individual return to a rotational center of the object; and determining, based at least in part on the first distance and the second distance, a yaw rate of the object about the rotational center.

H: The method of example G, wherein the determining the yaw rate comprises: projecting a unit vector along the first distance over the second distance.

I: The method of example G or example H, wherein the determining the yaw rate comprises simultaneously projecting unit vectors associated with individual of the subset of the radar returns.

J: The method of any one of example G through example I, further comprising determining, based at least in part on the first distance and the second distance, a two-dimensional velocity of the object.

K: The method of any one of example G through example J, wherein the determining the subset of the radar returns associated with the object comprises generating a cluster of radar returns clustered based at least in part on at least one of positions of the radar returns, velocities of the radar returns, or signal strengths of the radar returns.

L: The method of any one of example G through example K, further comprising: receiving historical information about the object, the historical information comprising at least one of an historical velocity, an historical acceleration, a historical yaw rate, a historical orientation, or an historical position of the object, wherein the determining the subset of the radar returns comprises associating radar returns with the object based at least in part on the historical data.

M: The method of any one of example G through example L, further comprising: receiving timestamp information associated with the radar returns, wherein the determining the subset of radar returns comprises determining, based on the timestamp information, the subset of radar returns as returns within a period of time, and wherein the yaw rate is an instantaneous yaw rate determined for the period of time.

N: The method of any one of example G through example M, further comprising: receiving historical information comprising one or more of a previously determined yaw rate or velocity of the object; and determining, based at least in part on the historical information and the timestamp information, estimated radar data for one or more of the subset of radar returns, wherein the yaw rate is determined based at least in part on the estimated radar data.

O: The method of any one of example G through example N, wherein the estimated radar data comprises, for a radar return having first timestamp information identifying a first time, an estimated velocity of the radar return at a second time different from the first time.

P: One or more example non-transitory computer-readable media storing instructions that, when executed, cause one or more processors to perform operations comprising: receiving radar data from one or more radar sensors; determining a subset of the radar data associated with an object, the subset of the radar data including a radar return associated with a first time; receiving historical information about the object, the historical information comprising at least one of a previous velocity of the object, a previous position of the object, or a previous yaw rate of the object; determining, based at least in part on the historical information and the radar return, an estimated radar return comprising a projection of the radar return to a second time different from the first time; and determining, based at least in part on the estimated radar return and a plurality of additional radar returns associated with the subset of the radar data, a yaw rate of the object.

Q: The one or more non-transitory computer-readable media of example P, wherein the determining the subset of the radar returns associated with the object comprises identifying a cluster of radar returns, the cluster being based at least in part on at least one of positions of the radar returns, velocities of the radar returns, or signal strengths of the radar returns.

R: The one or more non-transitory computer-readable media of example P or example Q, the operations further comprising: receiving timestamp information associated with the radar returns, wherein the determining the subset of radar returns comprises determining, based on the timestamp information, the subset of radar returns as returns within a time range.

S: The one or more non-transitory computer-readable media of any one of example P through example R, wherein the determining the yaw rate comprises: determining, for the return, a first distance between a first position associated with the return and a radar sensor of the one or more radar sensors generating the return; and determining, for the return, a second distance between the first position and a second position associated with a center of rotation of the object; wherein the yaw rate is based at least in part on a projection of a velocity of the return along the second distance over the first distance.

T: The one or more non-transitory computer-readable media of any one of example P through example S, wherein the operations further comprise determining a two-dimensional velocity of the object based at least in part on the estimated radar return and a plurality of additional radar returns associated with the subset of the radar data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. An autonomous vehicle comprising:
   a first radar sensor on the vehicle;
   a second radar sensor on the vehicle;
   one or more processors; and
   memory storing processor-executable instructions that, when executed by the one or more processors, cause to vehicle to perform acts comprising:
      receiving, from the first radar sensor, first radar returns;
      receiving, from the second radar sensor, second radar returns;
      determining a subset of radar returns associated with an object in an environment of the autonomous vehicle, the subset of radar returns comprising a plurality of the first radar returns and at least one of the second radar returns and being associated with a time;
      determining a center of rotation of the object;
      projecting one or more velocities associated with the subset of radar returns onto the center of rotation of the object,
      determining, based on the projecting, a yaw rate of the object about the center of rotation and a two-dimensional velocity of the object at the time; and
      generating, based at least in part on the yaw rate, a travel path through the environment relative to the object.

2. The autonomous vehicle of claim 1, wherein a first radar return of the first radar returns and a second radar return of the second radar returns include timestamp information, the acts further comprising:
   receiving historical information about at least one of the autonomous vehicle or the object; and
   determining, based at least in part on the historical information and the timestamp information, estimated radar data for an individual of the plurality of radar returns, wherein the yaw rate is determined based at least in part on the estimated radar data.

3. The autonomous vehicle of claim 2, wherein the time is a first time and the estimated radar data comprises a projection of a velocity from a second time prior to the first time.

4. The autonomous vehicle of claim 2, wherein:
   the first radar returns are associated with a first radar scan captured at the time and the time is a first time,
   the second radar returns are associated with a second radar scan captured at a second time prior to the first time,
   the historical information comprises at least one of an object velocity or an object yaw rate at the second time, and
   determining the estimated radar data comprises:
      determining an estimated track of the object from the second time to the first time; and
      estimating at least one of a depth or a velocity of at least one of the second radar returns based at least in part on the estimated track.

5. The autonomous vehicle of claim 1, wherein the determining the yaw rate comprises:
   determining, for a return of the subset of radar returns, a first distance between a position associated with the return and the first radar sensor or the second radar sensor; and
   determining, for the return, a second distance between the first position and a second position associated with the center of rotation;
   wherein the yaw rate is based at least in part on a projection of a velocity along the second distance over the first distance.

6. The autonomous vehicle of claim 1, wherein the generating the travel path includes generating a predicted motion of the object based at least in part on the yaw rate, the acts further comprising:
   controlling the vehicle to travel along the travel path.

7. A method comprising:
   receiving radar returns from at least one radar sensor, the radar returns including information about a first distance to the at least one radar sensor;
   determining a subset of the radar returns associated with an object;
   for individual returns of the subset of the radar returns, determining a second distance from a location associated with the individual return to a rotational center of the object;
   for the individual returns, projecting a velocity over the second distance;
   determining, based at least in part on the projecting, a yaw rate of the object about the rotational center; and
   controlling, based at least in part on the yaw rate, a vehicle relative to the object.

8. The method of claim 7, wherein the projecting comprises:
   projecting a unit vector along the first distance over the second distance.

9. The method of claim 8, wherein the projecting comprises simultaneously projecting unit vectors associated with individual of the subset of the radar returns.

10. The method of claim 7, further comprising determining, based at least in part on the first distance and the second distance, a two-dimensional velocity of the object.

11. The method of claim 7, wherein the determining the subset of the radar returns associated with the object comprises generating a cluster of radar returns clustered based at least in part on at least one of positions of the radar returns, velocities of the radar returns, or signal strengths of the radar returns.

12. The method of claim 7, further comprising:
   receiving historical information about the object, the historical information comprising at least one of an historical velocity, an historical acceleration, a historical yaw rate, a historical orientation, or an historical position of the object, wherein the determining the subset of the radar returns comprises associating radar returns with the object based at least in part on the historical information.

13. The method of claim 7, further comprising:
receiving timestamp information associated with the radar returns,
wherein the determining the subset of radar returns comprises determining, based on the timestamp information, the subset of radar returns as returns within a period of time, and
wherein the yaw rate is an instantaneous yaw rate determined for the period of time.

14. The method of claim 13, further comprising:
receiving historical information comprising one or more of a previously determined yaw rate or velocity of the object; and
determining, based at least in part on the historical information and the timestamp information, estimated radar data for one or more of the subset of radar returns,
wherein the yaw rate is determined based at least in part on the estimated radar data.

15. The method of claim 14, wherein the estimated radar data comprises, for a radar return having first timestamp information identifying a first time, an estimated velocity of the radar return at a second time different from the first time.

16. One or more non-transitory computer-readable media storing instructions that, when executed, cause one or more processors to perform operations comprising:
receiving radar data from one or more radar sensors;
determining a subset of the radar data associated with an object, the subset of the radar data including a radar return associated with a first time;
receiving historical information about the object, the historical information comprising at least one of a previous velocity of the object, a previous position of the object, or a previous yaw rate of the object;
determining, based at least in part on the historical information and the radar return, an estimated radar return comprising a projection of the radar return to a second time different from the first time;
projecting a velocity associated with the estimated radar return onto a center of rotation of the object;
determining, based at least in part on the projecting the velocity associated with the estimated radar return and a plurality of additional radar returns associated with the subset of the radar data, a yaw rate of the object; and
controlling, based at least in part on the yaw rate, a vehicle relative to the object.

17. The one or more non-transitory computer-readable media of claim 16, wherein the determining the subset of the radar returns associated with the object comprises identifying a cluster of radar returns, the cluster being based at least in part on at least one of positions of the radar returns, velocities of the radar returns, or signal strengths of the radar returns.

18. The one or more non-transitory computer-readable media of claim 16, the operations further comprising:
receiving timestamp information associated with the radar returns,
wherein the determining the subset of radar returns comprises determining, based on the timestamp information, the subset of radar returns as returns within a time range.

19. The one or more non-transitory computer-readable media of claim 16, wherein the determining the yaw rate comprises:
determining, for the return, a first distance between a first position associated with the return and a radar sensor of the one or more radar sensors generating the return; and
determining, for the return, a second distance between the first position and a second position associated with the center of rotation of the object;
wherein the yaw rate is based at least in part on a second projection of a velocity of the return along the first distance over the second distance.

20. The one or more non-transitory computer-readable media of claim 16, wherein the operations further comprise determining a two-dimensional velocity of the object based at least in part on the estimated radar return and a plurality of additional radar returns associated with the subset of the radar data.

* * * * *